United States Patent [19]
Norton

[11] Patent Number: 5,343,675
[45] Date of Patent: Sep. 6, 1994

[54] MOTION SENSING SAFETY INTERLOCK

[75] Inventor: Louis Norton, Pella, Iowa

[73] Assignee: Vermeer Manufacturing Company, Pella, Iowa

[21] Appl. No.: 721,298

[22] Filed: Jun. 26, 1991

[51] Int. Cl.⁵ .................... A01D 45/02; A01D 75/18
[52] U.S. Cl. .................... 56/10.2 R; 56/DIG. 15; 172/2; 460/1
[58] Field of Search ............... 56/1, 10.2, DIG. 15; 460/1, 6; 172/2, 3; 180/282; 73/518, 519

[56] References Cited

U.S. PATENT DOCUMENTS

| | | | |
|---|---|---|---|
| 3,773,156 | 11/1973 | Nyquist | 56/10.2 X |
| 4,323,136 | 4/1982 | van der Lely et al. | 56/DIG. 15 X |
| 4,878,338 | 11/1989 | Aldred et al. | 56/DIG. 15 X |
| 5,025,614 | 6/1991 | Orsborn et al. | 56/10.2 |

Primary Examiner—David J. Bagnell
Attorney, Agent, or Firm—Kent A. Herink; Brian J. Laurenzo; Brett J. Trout

[57] ABSTRACT

A motion sensing safety interlock which disables one or more equipment elements of a ground-traveling machine upon stopping or slowing of the machine below a preselected ground speed. A speedometer cable interconnects a wheel of the machine and a monitor box in which is mounted for rotation by the cable a ferrous star wheel. Lobes of the star wheel pass between poles of a magnetic reed switch which changes state at a frequency corresponding to the rotational speed of the wheel. Electrical circuitry monitors the reed switch and disengages an electric clutch to stop the equipment elements upon the stopping of ground travel of the machine.

5 Claims, 3 Drawing Sheets

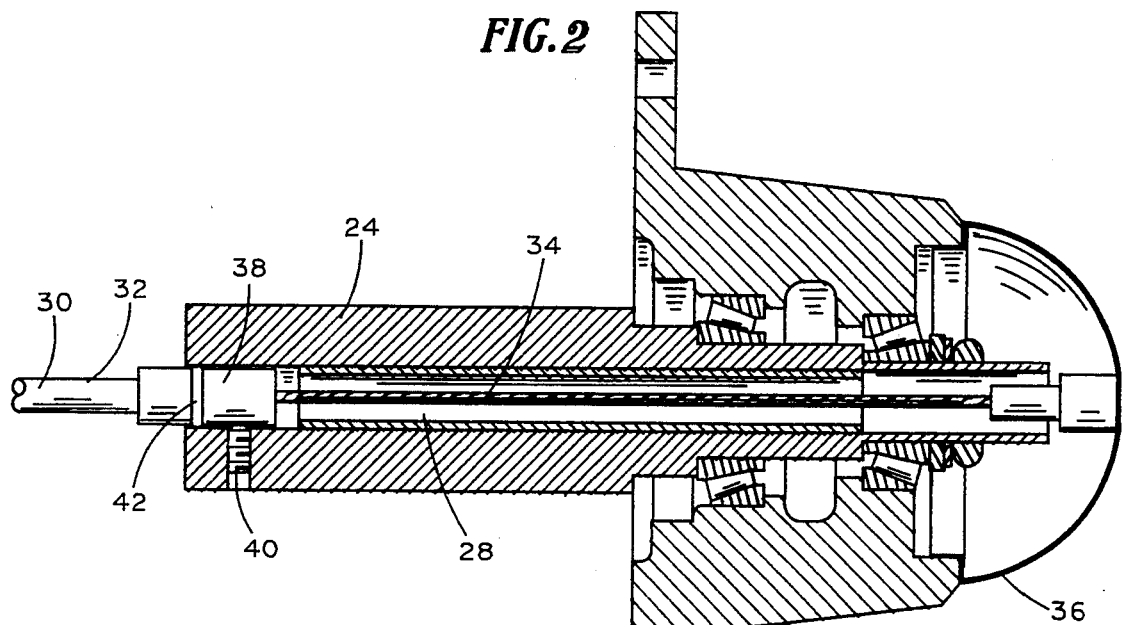
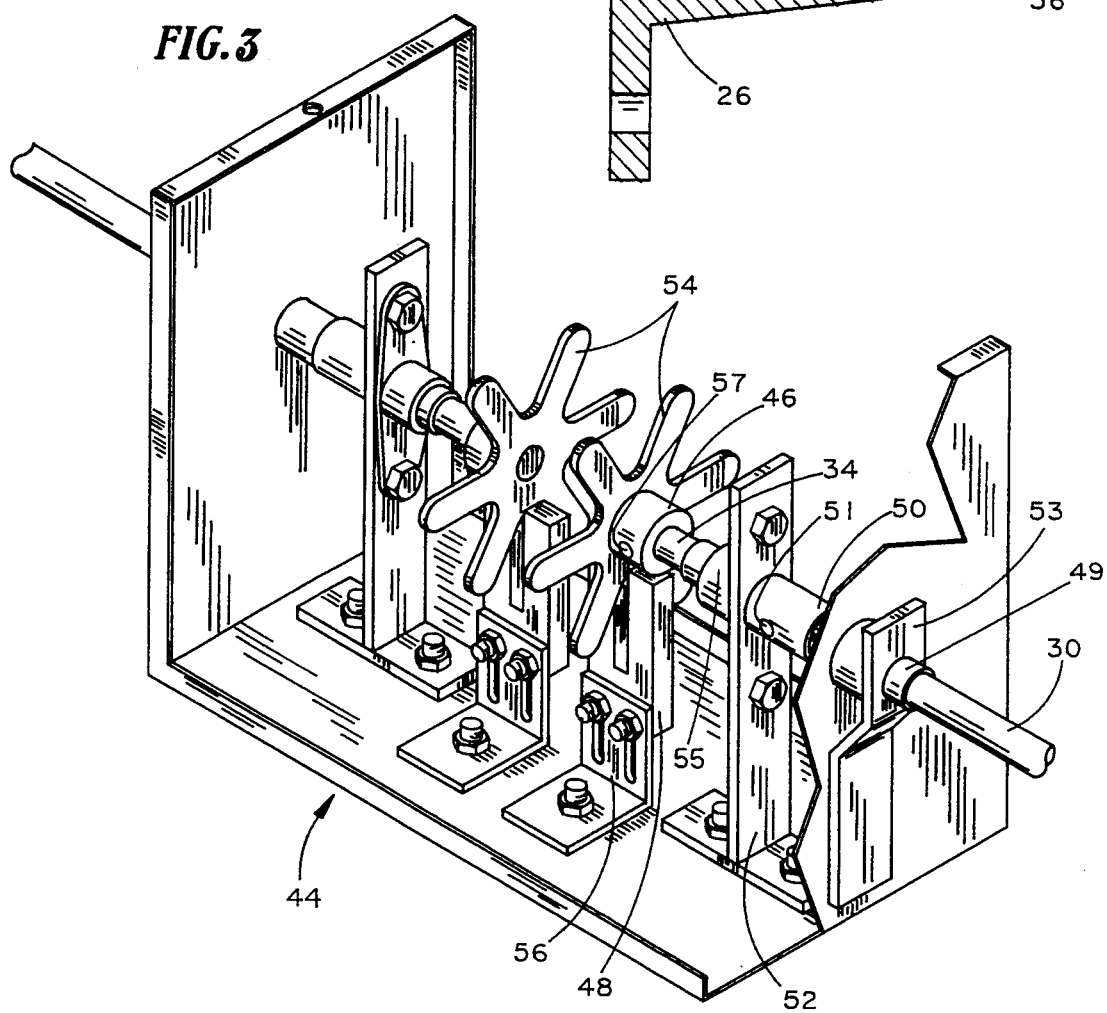

MOTION SENSING SAFETY INTERLOCK

BACKGROUND OF THE INVENTION

The invention relates to safety devices for mechanical equipment and, more specifically, to a motion sensing monitor that turns off certain equipment elements of a ground-traveling machine when the machine either stops or slows below a threshold speed.

Ground traveling machines are employed in a wide variety of industries and applications, most notably agriculture and earth moving. While manufacturers of these machines take great care to design and shield the machines so as to limit the likelihood of injury to operators during use of the equipment, injuries still result due to tampering with the shielding or when operators ignore the operating instructions or warnings. An effective approach to further limiting operator injuries is to provide interlocks that turn-off the accessible moving parts of the machines when the operator approaches the moving parts or leaves the operator's station. For example, riding lawn mowers frequently include switches in the operator's seat which act to stop the rotating blade when the weight of the operator is no longer on the seat.

A motion sensing monitor for ground-traveling machinery is known wherein one or more magnets are mounted on an axle that is extended across the full transverse width of the machine. As the machine travels across the ground, the magnet is rotated on the axle. A magnetic sensing device is mounted on the frame of the machine so that it senses the magnet on each pass. Monitoring circuitry calculates and displays acres covered by the machine and ground speed.

SUMMARY OF THE INVENTION

The present invention is a motion sensing monitor and safety interlock to stop moving elements of a ground traveling machine upon slowing of the machine below a preselected threshold. A coaxial cable having a stationary outer sleeve and a rotatable inner cable interconnects a monitor box and a wheel cap of the machine. The cable passes through an axial throughbore in a stub axle that mounts the wheel and wheel cap and attaches at an end portion thereof to the wheel cap so that the inner cable rotates with rotation of the wheel and wheel cap. The opposite end portion of the inner cable rotates a ferrous star wheel in the monitor box, the rotation of which is sensed by a magnetic reed switch and associated electrical circuitry. If the rotational speed of the star wheel drops below a preselected threshold, the electrical circuitry changes the state of one or more electrical clutches to disable one or more moving elements of the machine.

An object of the invention is to provide a safety interlock for a ground-traveling machine that prevents operator injury by stopping the movement of one or more elements of the machine if the speed of the machine slows below a preselected threshold.

Another object of the invention is to provide a motion sensing monitor that senses the motion of wheels of a ground traveling machine on either side of the machine to disable movement of one or more elements of the machine only upon slowing of both wheels of the machine below a preselected threshold.

These and other objects of the invention will become obvious to one skilled in the art upon review and understanding of the accompanying drawings, specification and claims.

BRIEF DESCRIPTION OF THE DRAWINGS

FIG. 2 is a cross sectional view of a stub axle of the corn picker taken along line 2—2 of FIG. 1;

FIG. 3 is a perspective view of the monitor box with parts of the outer casing broken away to show a pair of star wheels;

DETAILED DESCRIPTION OF A PREFERRED EMBODIMENT

Figure 1:
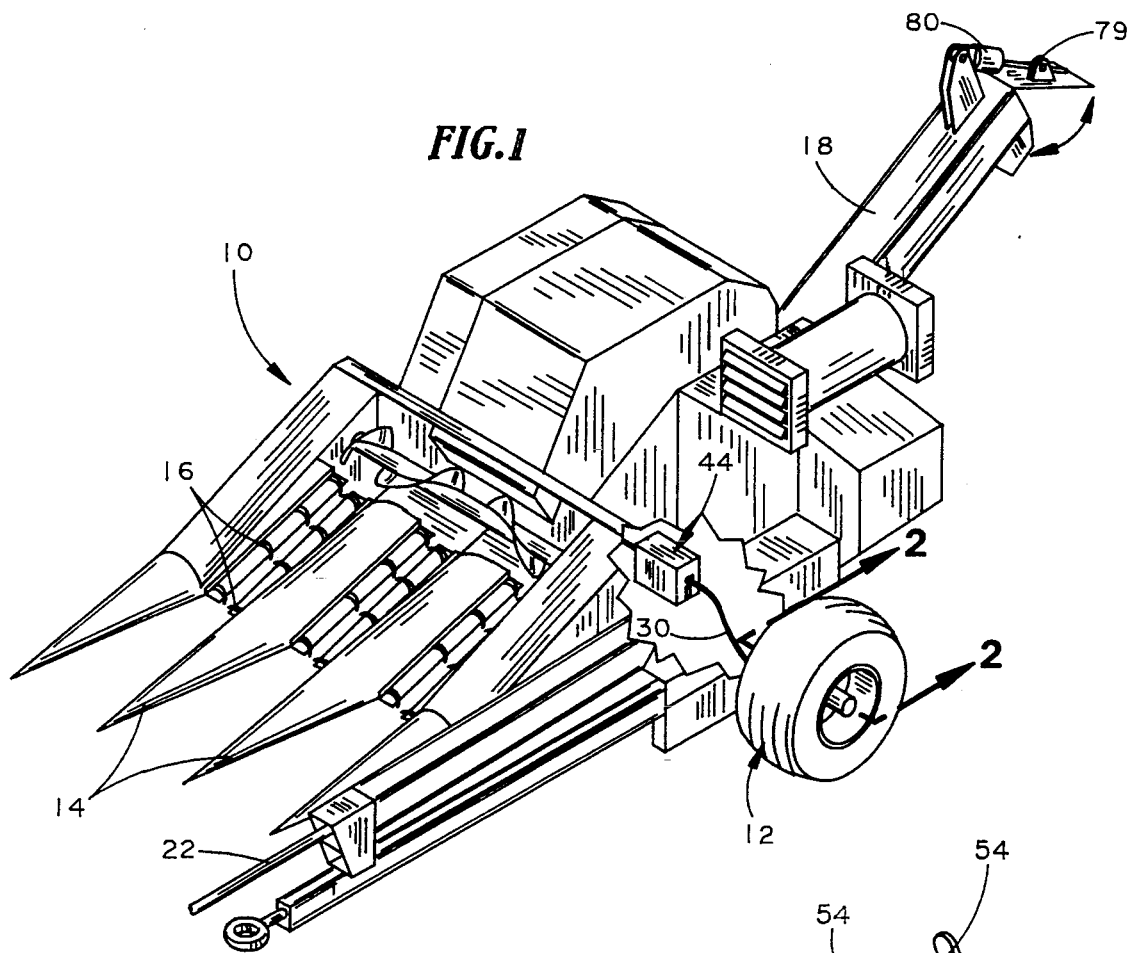
FIG. 1 is a perspective view of a tractor-drawn corn picker with parts broken away to show a monitor box of the present invention.
Figure 4:
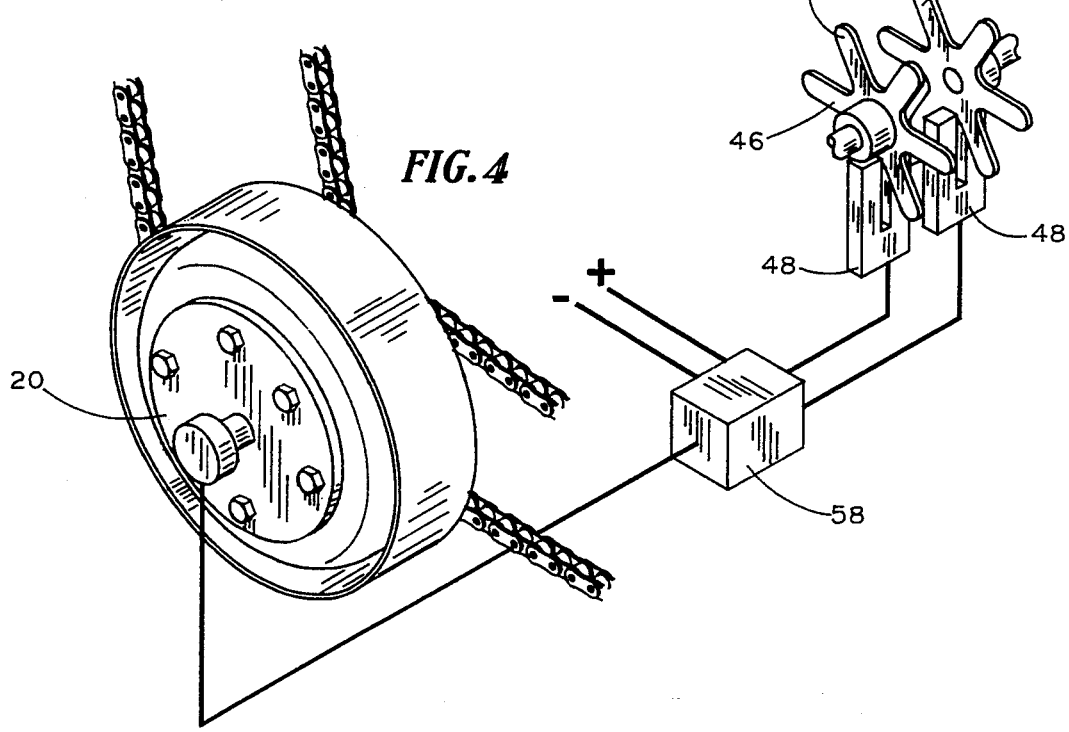
FIG. 4 is a schematic diagram showing the electrical circuitry for monitoring the rotational speed of the star wheels and releasing an electric clutch.

Illustrated in FIG. 1, generally at 10, is a tractor drawn corn picker including a pair of wheels, only the right one 12 of which is illustrated. The corn picker 10 includes a plurality of dividing cones 14 between which are located a plurality of snapping rollers 16 which act to remove the ears from the stalks for processing by the picker. Also included on the picker 10 is a discharge conveyor 18 for carrying the ears of corn from the main body of the picker 10 to a high, rearward position for discharge into a wagon, truck, or the like. The snapping rollers 16 and the discharge conveyor 18 are each controlled by an associated electric clutch 20 (FIG. 4). When the clutches 20 are engaged, the snapping rollers 16 and the discharge conveyor 18 will be operated by power take-off of the tractor through an input shaft 22 of the picker 10 in the usual manner. Changing the state of the clutches 20 will disengage the clutches 20 and interrupt power to the snapping rollers 16 and conveyor 18 so that they come to a stop.

The wheels 12 are each mounted for rotation on a stub axle 24 by being bolted or similarly attached to a hub 26 (FIG. 2). Each stub axle 24 has a longitudinal axial throughbore 28 for receiving a speedometer cable 30 of the coaxial type including an outer sleeve 32 and an inner cable 34 that is rotatable within the outer sleeve 32. The inner cable 34 extends beyond the outer sleeve 32 and is fixedly received in a hub cap 36 which is rotated with the wheel 12 and hub 26. An end portion of the outer sleeve 32 is secured to an enlarged collar 38 that is received in the inner end portion of the throughbore 28. A set screw 40 holds the collar 38 in place and prevents the outer sleeve 32 from rotating with the inner cable 34. An O-ring 42 encircles the collar 38 to seal the throughbore 28 against the entry of dirt and the like during use of the picker 10.

The speedometer cables 30 extend from the stub axles 24 inwardly to a monitor box 44 (FIGS. 1 and 3). Only one side of the monitor box and its associated parts will be described, it being understood that the other side is identical in construction. A ferrous star wheel 46 is mounted for rotation by the inner cable 34 of the speedometer cable 30 between the poles of an associated magnetic reed switch 48. The speedometer cable 30 enters through an end panel of the monitor box 44. An enlarged portion 49 of speedometer cable 30 is secured to the side panel of the monitor box 44 by a retaining bracket 53. The free end of inner cable 34 of the speedometer cable 30 attaches to one end of a shaft 50 by means of a set screw 51. The shaft 50 is supported by an upright post 52 for rotation in a bearing 55. The other end of the shaft 50 is received inside a collar of the ferrous star wheel 46 to which it is secured by means of a set screw 57.

Rotation of the inner cable 34, accordingly, causes rotation of the star wheel 46 in a vertical plane at a rotational speed equal to that of the associated ground engaging wheel 12. The star wheel 46 has six equally spaced, radially extended lobes 54 that pass between the poles of the magnetic reed switch 48 upon rotation of the star wheel 46. The reed switch 48 changes state each time one of the lobes 54 is extended between the poles thereof and changes back again when the lobe 54 is rotated beyond the poles. Accordingly, the reed switch 48 will change between an open and closed state (open to closed, or closed to open) twelve times for each rotation of the wheel 12. The reed switch 48 is mounted on a stand 56 for vertical adjustment and alignment with the plane of rotation of the star wheel 46.

Electrical circuitry, shown schematically at 58 in FIG. 4, is connected to the reed switches 48. The circuitry 58 is attached to the electrical system of the tractor and monitors the changing of state of the reed switches 48. If the number of changes per unit time of both of the reed switches 48 falls below a preset value, the electrical circuitry 58 will disengage the electric clutches 20 through which rotational power is transmitted for operation of the snapping rollers 16 and the discharge conveyor 18. Disengagement of the electric clutches 20, accordingly, will disable the snapping rollers 16 and the conveyor 18 so that they will come to a stop.

Figure 5:
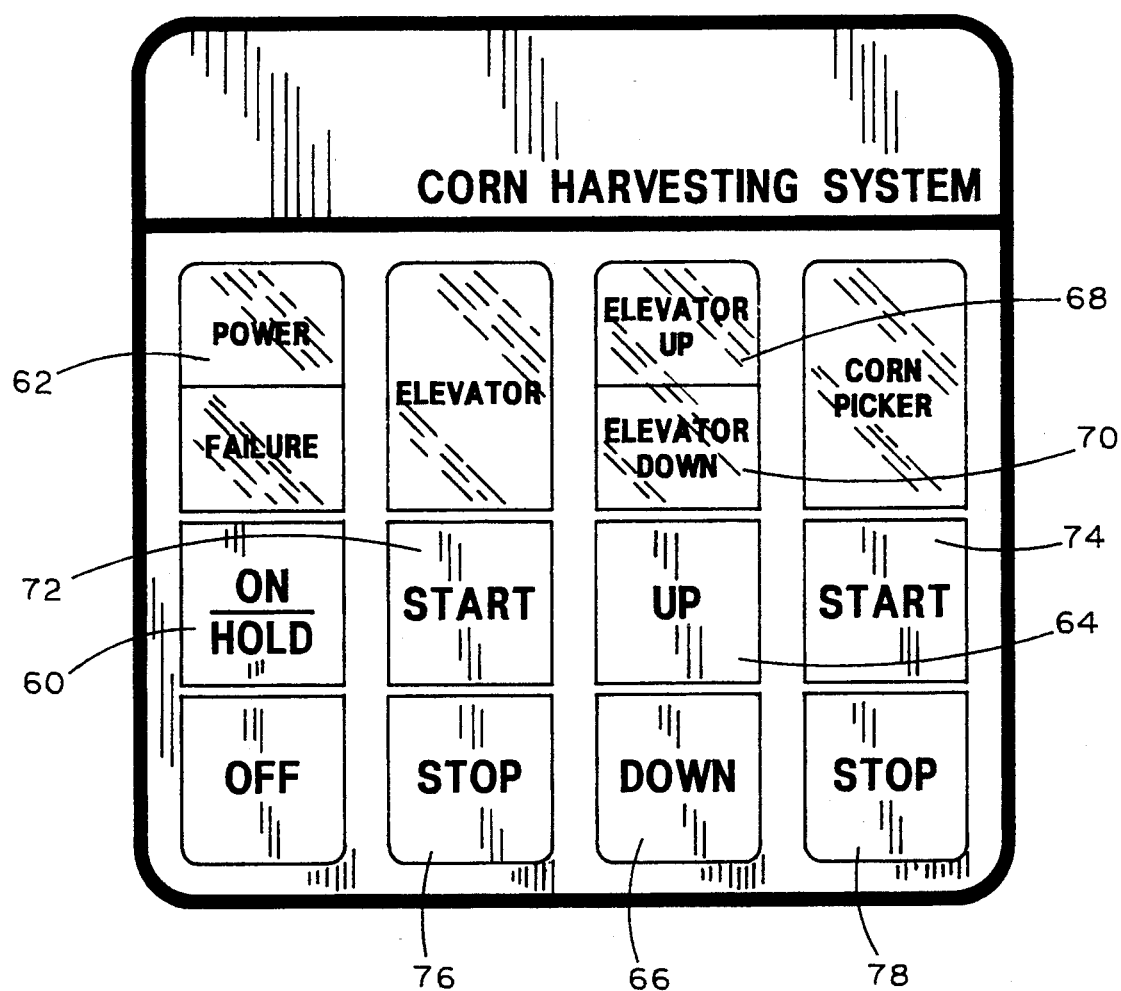
FIG. 5 is a front view of a control panel for controlling the electrical circuitry and the corn picker.

The electrical circuitry 58 is controlled by an operator at a control box located in the cab of the tractor, the face panel of which is illustrated in FIG. 5. When the electrical circuitry 58 is attached to the battery of the tractor the ON/HOLD switch 60 will activate the electrical circuitry 58 lighting the POWER indicator 62. A deflector 79 on the conveyor or elevator 18 can be moved up or down by means of an electric actuator 80 by depression of the corresponding UP switch 64 or DOWN switch 66 whereupon the ELEVATOR UP indicator 68 or ELEVATOR DOWN indicator 70, respectively, will be activated. Simultaneous depression of both the UP switch 64 and the DOWN switch 66 will shut off the electric actuator 80 and result in no action.

When the POWER indicator 62 is lit, simultaneous depression of the elevator START switch 72 and the ON/HOLD switch 60 will activate the electric clutch associated with the elevator 18. Similarly, simultaneous depression of the corn picker START switch 74 and the ON/HOLD switch 60 will activate the electric clutch associated with the snapping rollers 16. As an alternative to holding the ON/HOLD switch 60 depressed, the electric clutches will be activated upon depression of the START switches 72 and 74 if the rate of the changing of state of either of the reed switches 48 is sensed by the control box electrical circuitry to exceed the critical threshold. Accordingly, an operator in the cab of the tractor can activate the snapping rollers 16 and the elevator 18 even when the corn picker 10 is not moving by holding down the ON/HOLD switch 60. If the corn picker 10 is not moving above the critical speed, release of the ON/HOLD switch 60 will, after a ten second delay, result in the disengagement of the electric clutches and stopping of the associated equipment elements. Both the elevator 18 and the snapping rollers 16 have separate STOP switches 76 and 78 the depression of which will disengage the corresponding electric clutch.

To begin a corn picking operation, the operator would depress the ON/HOLD switch 60 and CORN PICKER START switch 74 then begin forward motion of the tractor and corn picker. Provided that within ten seconds the corn picker exceeds the threshold speed, the picker will continue to operate in the normal fashion. Upon falling below the critical speed, however, the control box electrical circuitry 58 will, after ten seconds, disengage the electrical clutches to stop the equipment elements. Accordingly, brief slowdowns or stops (e.g., when turning at the end rows) will not interfere with normal operation of the picker. If, however, the motion of the picker is below the threshold for more than ten seconds, the equipment elements will be deactivated.

If the operator stops or slows the tractor below the critical speed, for example to dismount the tractor and check on the operation of the picker or some of its equipment elements, the motion sensing safety interlock will sense the stopping of the picker and will stop the equipment elements by disengaging the electric clutches. With the equipment elements stopped, no injury due to operation of these elements can occur to the dismounted operator.

The motion sensing safety interlock is adaptable to a wide variety of equipment, including operating equipment elements that can be disabled upon stopping or slowing of the machine as an additional safety feature.

Although the invention has been described with respect to a preferred embodiment thereof, it is to be also understood that it is not to be so limited since changes and modifications can be made therein which are within the full intended scope of this invention as defined by the appended claims.

I claim:

1. A motion sensor and safety controller for controlling the operation of an equipment element of a ground-traveling machine, comprising:
   (a) ground-engaging rotary means for generating a signal in response to movement of the machine over the ground;
   (b) means for monitoring said signal;
   (c) switch means controlled by said monitor means for interrupting the operation of the equipment element when movement of the machine drops below a preselected speed for a preselected time.

2. A motion sensor and safety controller for controlling the operation of an equipment element of a ground-traveling machine, comprising:
   (a) an axially centered hub rotated upon movement of the equipment over the ground;
   (b) ground-engaging rotary means for generating a signal and response to movement of the machine over the ground.
   (c) means for monitoring said signal;
   (d) cable means interconnecting said hub and said monitor means; and
   (e) switch means controlled by said monitor means for interrupting the operation of the equipment element when movement of the machine drops below a preselected speed.

3. A controller as defined in claim 2 wherein the machine includes at least one stub axle having an axial throughbore in which is received said cable means.

4. A motion sensor and safety controller for controlling the operation of an equipment element of a ground-travelling machine, comprising:
   (a) ground-engaging rotary means for generating a signal in response to movement of the machine over the ground;
   (b) signal monitoring means having a magnetic reed switch, a ferrous member mounted for rotation in response to said signal, and means connected to said magnetic reed switch for changing the state of said switch means upon a drop in the rate of rotation of said ferrous member below a preselected level; and
   (c) switch means controlled by said monitor means for interrupting the operation of the equipment element when movement of the machine drops below a preselected speed.

5. A motion sensor and safety controller for controlling the operation of an equipment element of a ground-travelling machine, comprising:
   (a) a first ground-engaging rotary means for generating a signal in response to movement of the machine over the ground;
   (b) a second ground-engaging rotary means mounted distally to said first ground-engaging rotary means and laterally relative to said first ground-engaging rotary means plane of rotation;
   (c) signal monitoring means having a magnetic reed switch, a ferrous member mounted for rotation in response to said signal, and means connected to said magnetic reed switch for changing the state of said switch means upon a drop in the rate of rotation of said ferrous member below a preselected level; and
   (d) switch means controlled by said monitor means for interrupting the operation of the equipment element when movement of the machine drops below a preselected speed.

* * * * *